United States Patent [19]
Gerard

[11] 4,209,083
[45] Jun. 24, 1980

[54] DISC BRAKE AND A GUIDE KEY FOR SUCH A BRAKE

[75] Inventor: Jean-Louis Gérard, Paris, France

[73] Assignee: Societe Anonyme DBA, Paris, France

[21] Appl. No.: 960,980

[22] Filed: Nov. 15, 1978

[30] Foreign Application Priority Data

Nov. 17, 1977 [FR] France .............................. 77 34537

[51] Int. Cl.$^2$ ............................................. F16D 65/02
[52] U.S. Cl. ................................................ 188/73.6
[58] Field of Search ................... 188/73.3, 73.4, 73.6, 188/250 G

[56] References Cited

U.S. PATENT DOCUMENTS

| 3,621,946 | 11/1971 | Mori ...................................... | 188/73.6 |
| 3,695,398 | 10/1972 | Crawford ............................ | 188/73.6 |

FOREIGN PATENT DOCUMENTS

46-36525 10/1971 Japan ...................................... 188/73.6

*Primary Examiner*—Duane A. Reger

*Attorney, Agent, or Firm*—Paul David Schoenle; Ken C. Decker

[57] ABSTRACT

A disc brake which comprises a torque absorbing member associated with operating means capable of urging at least one friction member onto a brake disc. The friction member cooperates with the circumferentially spaced edges of an aperture formed in the torque absorbing member by way of one guide key. The key comprises at least one recess permitting radial extraction of the friction member through the aperture when the friction member is situated opposite the recess. The key is capable of occupying an operative position, in which the recess is offset relative to the friction member, and a removal position in which the recess is opposite the friction member. The cross-section of the key forms a V of which the inside face cooperates with the corresponding edge of the aperture and the outside faces slidably receive the friction member. One arm of the V defined by the key extends towards the brake interior whereas the other arm is substantially perpendicular to the radial plane of symmetry of the brake. The recess is formed in the arm which extends towards the brake interior.

11 Claims, 6 Drawing Figures

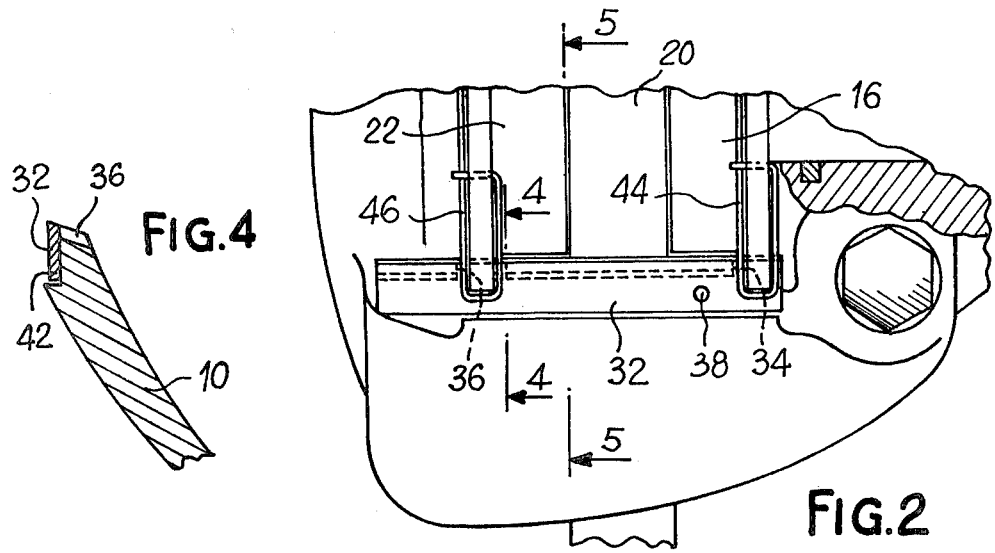
FIG.4
FIG.2
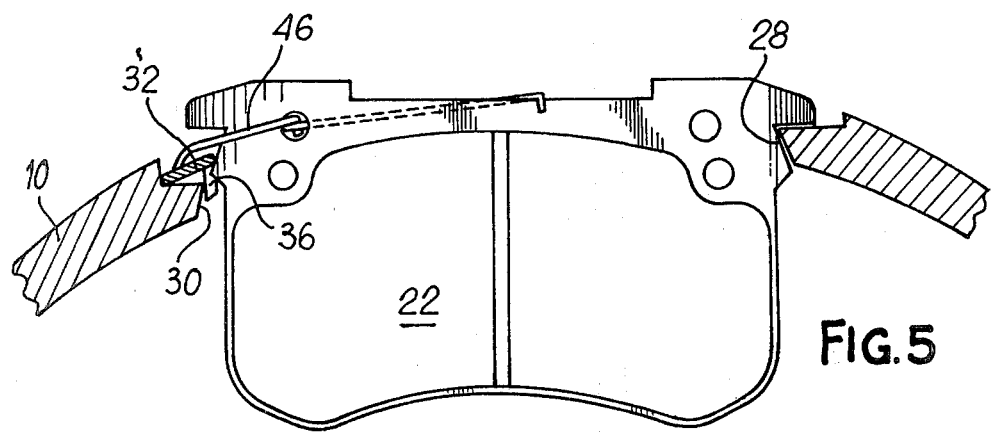
FIG.5
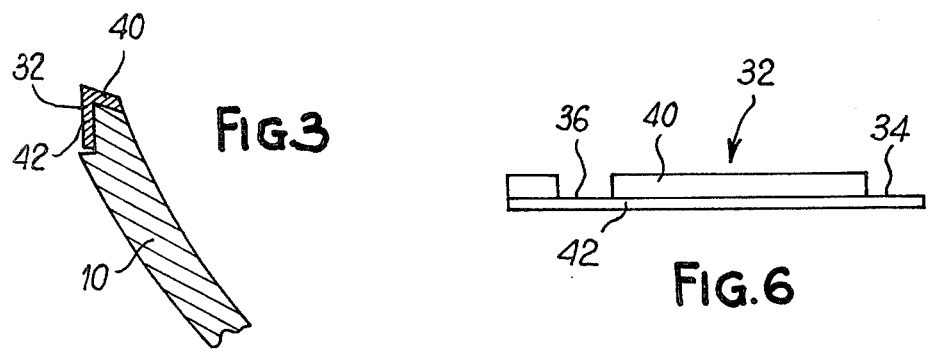
FIG.3
FIG.6

DISC BRAKE AND A GUIDE KEY FOR SUCH A BRAKE

The invention relates to a disc brake for a motor vehicle, and to a guide key for such a brake.

Known disc brakes are of numerous types and are generally classed in two large categories: fixed-caliper disc brakes and sliding-caliper disc brakes. Fixed-caliper disc brakes are disc brakes in which a fixed support member is equipped with opposite operating means urging two friction members on to the respective sides of a rotary disc. Sliding-caliper disc brakes, on the other hand, are brakes in which a caliper or frame is slidable relative to a fixed portion of the vehicle and comprises operating means on one side of the disc only, so that the operating means urge one of the friction members on to the corresponding side of the disc directly and the other friction member on to the other side of the disc by reaction by way of the caliper. In the latter type of brake the friction members may be slidable on the fixed portion of the vehicle or on the slidable caliper or frame, whereas in fixed-caliper disc brakes the torque-absorbing member is necessarily the fixed caliper.

In both these types of brake, the member absorbing the braking torque customarily contains a substantially rectangular radial aperture to allow replacement of the friction members when the friction linings of the latter are worn.

The various means for permitting installation and removal of the friction members include a guide key provided between at least one of the circumferential edges of the aperture in the torque-absorbing member and the friction members. In such an arrangement the removal of the key allows extraction of the friction members. However, it has been found that the operation of inserting the guide key by translating it after the fitting of the friction members is very difficult and often leads to jamming of the key, because there is little or no clearance between the friction members, the key and the torque-absorbing member. The key is even more difficult to insert where a noise-reducing spring is associated with the friction members and comes to bear on the key after its insertion.

Another proposed solution permitting radial extraction of the friction members through the aperture in the torque-absoring member consists in providing at least one of the circumferential edges of the aperture with one or more recesses which allow radial extraction of the friction members when they are brought opposite the recesses. However the recesses are necessarily offset relative to the position normally occupied by the friction members during brake operation, so that either it is impossible to remove the friction members in the presence of the disc, or the axial dimensions of the brake are substantially increased. In the former case, the torque-absorbing member must be at least partly removed in order to replace the friction members which is unfortunate. In the case of removal of the friction members in the presence of the disc, the space occupied by the brake is substantially increased, if the brake's position in the vehicle permits. In the latter case, in order to restrict the size of the brake, it is usual to limit the amount by which the recesses are offset relative to the position normally occupied by the friction members. As a result of this practice the friction members sometimes escape accidentally through the recesses, rendering the brake completely useless. Where the position of the brake in the vehicle prevents any increase in its size, the presence of recesses for the purpose of radial extraction of the friction members then leads to a reduction in the efficiency of the brake, and this runs counter to current braking efficiency requirements.

The invention proposes a solution which makes it possible to overcome the disadvantages of the solutions described above, while retaining their advantages.

To this end, the invention proposes a disc brake comprising a torque-absorbing member associated with operating means capable of urging at least one friction member on to a brake disc, the friction member cooperating with the circumferentially spaced edges of an aperture formed in the torque-absorbing member by way of at least one guide key, characterized in that the key comprises at least one recess permitting radial extraction of the friction member through the aperture when the friction member is situated opposite the recess, the key being capable of being linearly shifted between an operative position, in which the recess is offset relative to the friction member, and a removal position, in which the recess is situated opposite the friction member.

According to another feature of the invention, locking means are provided to normally hold the key in its operative position.

The invention also relates to a guide key for at least one friction member for a disc brake, characterized in that it is designed for a disc brake in accordance with the invention.

A particular embodiment of the invention will now be described by way of example only with reference to the accompanying drawings, in which:

FIG. 2 is a partial view, similar to FIG. 1, in which the guide key for the disc brake shown in FIG. 1 occupies a position allowing the installation and removal of the friction members;

FIG. 3 represents a section along a line 3—3 in FIG. 1;

FIG. 4 is a section along a line 4—4 in FIG. 2;

FIG. 5 is a section along a line 5—5 in FIG. 2; and

FIG. 6 is a general view of the guide key used in the disc brake shown in FIGS. 1 to 5.

Figure 1:
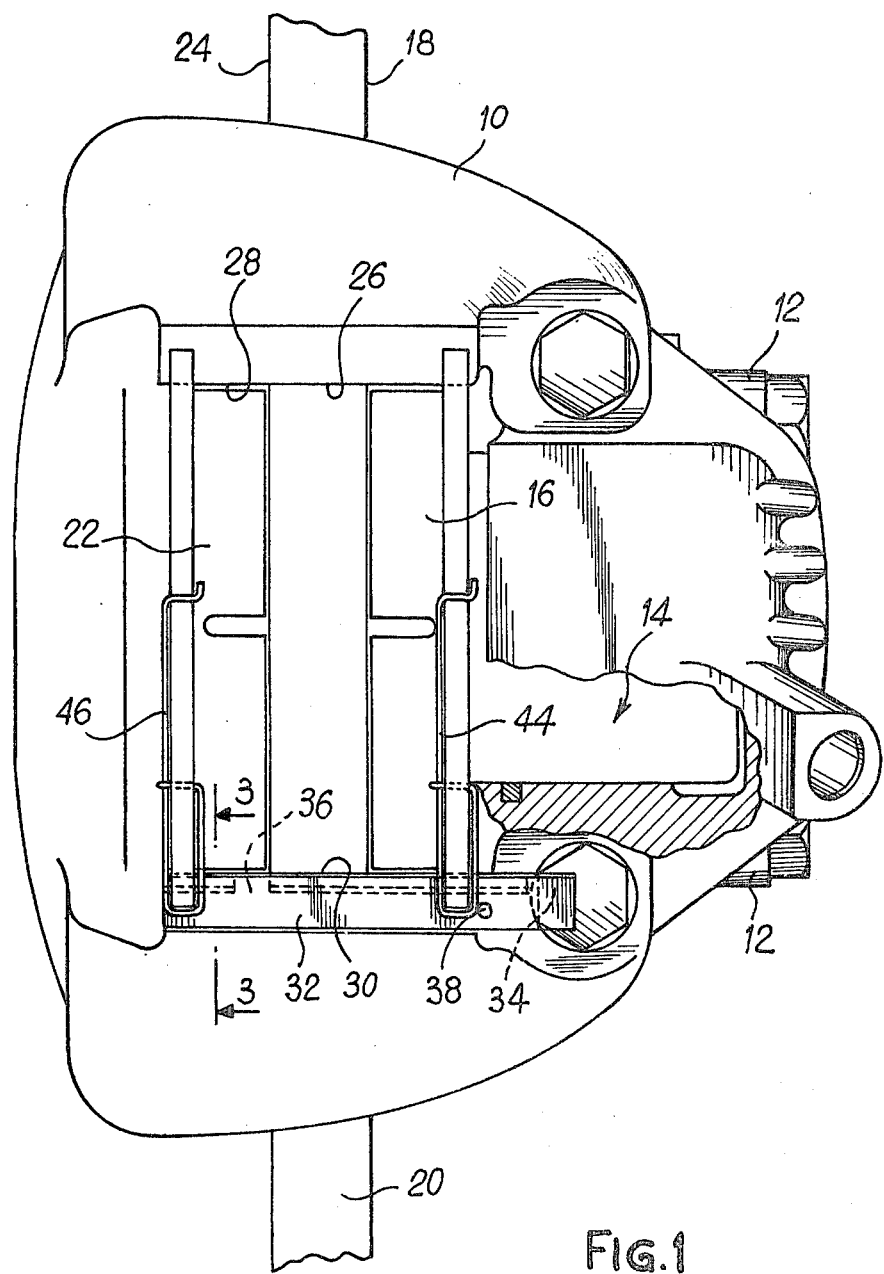
FIG. 1 is a plan view, partly cut away, of a disc brake embodying the principles of the invention.

The disc brake illustrated in FIG. 1 has a movable caliper or frame 10 slidable, for example by means of two mounting pins 12, on a fixed support member (not shown). Operating means, comprising a hydraulic brake actuator 14 in the embodiment illustrated, are associated with the caliper 10 and are so arranged as to urge a friction member 16 directly on to a first face 18 of a brake disc 20 associated with a vehicle wheel (not shown). When the brake actuator 14 operates, the caliper 10 urges a second friction member 22 by reaction on to the other face 24 of the disc 20.

As best shown in FIGS. 1 and 5, that portion of the caliper 10 straddling the disc 20 contains a substantially rectangular radial aperture 26 of which the circumferentially spaced edges 28,30 support friction members 16,22, so that the caliper 10 constitutes a torque-absorbing member for the friction members. In addition a guide key 32 is provided between the friction members 16,22 and the edge 30 of the aperture 26. Note that, as FIG. 5 clearly shows, the respective dimensions of the friction members 16,22 and of the key 32 and the distance defined between the edges 28,30 are such that the friction members 16,22 can be extracted radially through the aperture 26 when the key 32 is not in its normal operative position (shown in FIG. 1).

In accordance with the invention, and as shown most clearly in FIG. 6, the key 32 contains two recesses 34,36 which are respectively offset relative to the backing plates of the two friction members 16,22 when the key is in its normal operative position (FIG. 1). It is by way of their backing plates that the friction members cooperate with the key 32. More particularly, the recess 36 is offset towards the disc relative to the backing plate of the friction member 22, whereas the recess 34 is offset away from the disc relative to the backing plate of the friction member 16. The offset between each recess 34 or 36 and the backing plate of the corresponding friction member 16 or 22 is substantially the same when the friction linings attached to these backing plates are new. The key 32 also contains a hole 38 capable of receiving a pin (not shown) or the like, so that the key can be locked in its normal operative position (FIG. 1) due to cooperation of the end of the pin with abutment means (not shown) associated with the caliper 10.

As FIGS. 3 to 5 show, the cross-section of the key 32 approximately forms a V of which the inside faces cooperate with the edge 30 of the aperture 26 and the outside faces slidably receive the friction members 16,22. One of the arms 40 of the V defined by the key 32 extends towards the interior of the brake, whereas the other arm 42 is substantially perpendicular to a radial plane of symmetry of the brake passing through the axis of the disc 20 and through the axis of the hydraulic brake actuator 14. Because of this arrangement, the recesses 34,36 are provided only in the arm 40 of the key 32 (FIG. 5). Moreover, the two arms 40,42 of the key 32 define an acute angle, and the friction members 16,22 are preferably substantially symmetrical relative to the above-mentioned plane of symmetry of the brake, which means that the edge of the aperture 26 and those portions of the friction members 16,22 anchoring on this edge are also V-shaped and define an angle substantially the same as the angle defined by the arms 40,42 of the key 32. Lastly, the key can slide along the edge 30 of the aperture 26 in a direction substantially parallel to the axis of the disc 20 when the key locking means constituted by the pin (not shown) in the hole 38 are removed.

The key 32 can then be translated or shifted from its normal operative position (FIG. 1) into a removal position (FIGS. 2 and 5), in which the backing plates of the friction members 16,22 are opposite the recesses 34,36 and the friction members 16,22 can therefore tilt as shown in FIG. 5 under the influence of noise-reducing springs 44,46 attached to the friction members 16,22 respectively and bearing on the outside face of the arm 42 of the key 32. Both friction members 16,22 can therefore be extracted radially through the aperture 26 without either completely removing the key 32 or tilting the caliper 10, and also without enlarging the axial dimensions of the brake assembly.

When the linings of the friction members 16,22 are worn, these members are replaced in the following manner:

Before removal of the members 16,22, the various components of the brake occupy the positions shown in FIG. 1. When their removal is required, the pin (not shown) passing through the hole 38 and abutting on the caliper 10 in order to lock the key 32 relative to the latter is removed. The key 32 can now be slid to the left in FIG. 1 and into the position shown in FIG. 2. In this removal position the backing plates of the friction members 16,22 are opposite their respective recesses 34,36, so that the springs 44,46 tilt the friction members 16,22 about the edge 28 of the aperture 26 as shown in FIG. 5. In this position, of course, the friction members can be readily removed through the aperture 26 and replaced with friction members bearing new linings. The friction members with new linings are inserted radially through the recesses 34,36 in the key 32, after the latter has been placed in its removal position (FIG. 2). The springs 44,46 now hold the friction members 16,22 and key 32 in the position shown in FIG. 5. A radial force directed towards the interior of the brake is now exerted on the left-hand end (in FIG. 5) of the friction members to compress the springs 44,46. At the same time the key 32, which is then in the removal position shown in FIG. 2, is moved to the right in FIGS. 1 and 2 and into its normal operative position (FIG. 1). The pin (not shown) is now replaced in the hole 38 to lock the key 32 in this position.

The invention is not, of course, restricted to a brake of the type described, but may be applied equally well to a brake of the fixed-caliper type in which the caliper is associated directly with a fixed portion of the vehicle and comprises opposite operating means acting directly on each of the friction members, or to a disc brake of the sliding-caliper or sliding-frame type in which the friction members are inserted in an aperture formed in a fixed portion of the vehicle bearing the caliper. In accordance with the invention, also, a key could be placed between the friction members and each of the opposite edges of the aperture.

I claim:

1. A disc brake comprising a torque-absorbing member associated with operating means capable of urging at least one friction member on to a brake disc, said brake disc being rotatable about an axis of rotation, the friction member cooperating with the circumferentially spaced edges of an aperture formed in the torque-absorbing member by way of at least one guide key, characterized in that the key comprises at least one recess permitting radial extraction of the friction member through the aperture when the friction member is situated opposite the recess, the key being linearly shiftable in a direction substantially parallel to the axis of brake disc rotation between an operative position, in which the recess is offset relative to the friction member, and a removal position, in which the recess is situated opposite the friction member.

2. A disc brake comprising a torque-absorbing member associated with operating means capable of urging at least one friction member on to a brake disc, the friction member cooperating with circumferentially spaced edges of an aperture formed in the torque-absorbing member by way of at least one guide key, characterized in that the cross-section of the key forms a V of which the inside faces cooperate with the corresponding edge of the aperture and the outside faces slidably receive the friction member, said key comprising at least one recess permitting radial extraction of the friction member through the aperture when the friction member is situated opposite the recess, one arm of the V defined by the key extending toward the brake interior whereas the other arm is substantially perpendicular to a radial plane of symmetry of the brake, the key being capable of occupying an operative position, in which the recess is offset relative to the friction member, and a removal position, in which the recess is situated opposite the friction member, the recess being formed in the arm extending toward the brake interior.

3. A disc brake as claimed in claim 1, characterized in that locking means are provided to normally hold the key in its operative position.

4. A disc brake as claimed in claim 3, characterized in that the locking means comprise at least one pin passing through a hole in the key and cooperating with abutment means associated with the torque-absorbing member.

5. A disc brake as claimed in any of claims 1, 3 or 4, characterized in that the key is capable of sliding along the corresponding edge of the aperture in a direction substantially parallel to the disc axis in order to occupy one or other of the said positions.

6. A disc brake as claimed in claim 1,
characterized in that the cross-section of the key forms a V of which the inside faces cooperate with the corresponding edge of the aperture and the outside faces slidably receive the friction member, one arm of the V defined by the key extending towards the brake interior whereas the other arm is substantially perpendicular to a radial plane of symmetry of the brake, the recess being formed in the arm extending towards the brake interior.

7. A disc brake as claimed in claim 2, characterized in that the two arms of the V defined by the key form an acute angle.

8. A disc brake as claimed in claim 7 or 2, characterized in that at least one noise-reducing spring is associated with the friction member and comes to bear on the outside face of the key arm perpendicular to the radial plane.

9. A disc brake as claimed in claim 1,
in which a second friction member cooperates with the circumferentially spaced edges of the aperture, characterized in that a second recess is provided in the key to permit radial extraction of the second friction member.

10. A disc brake as claimed in claim 9, characterized in that the first and second recess are offset in the same direction and by substantially equal distances relative to the corresponding friction members when the friction linings of the latter are new and when the key is in its operative position.

11. A disc brake as claimed in claim 10, in which the torque-absorbing member comprises a caliper or frame straddling the disc and slidable parallel to the disc axis on a non-rotating part, the operating means being situated on one side of the disc and acting on the first friction member directly and on the second friction member by reaction by way of the caliper, characterized in that the first recess is offset away from the disc relative to the first friction member and the second recess is offset towards the disc relative to the second friction member when the key is in its operative position.

* * * * *